Dec. 19, 1950 E. J. WALSH 2,534,392
METHOD OF MAKING GLASS WINDOW SEALS
Filed July 8, 1946 2 Sheets-Sheet 1
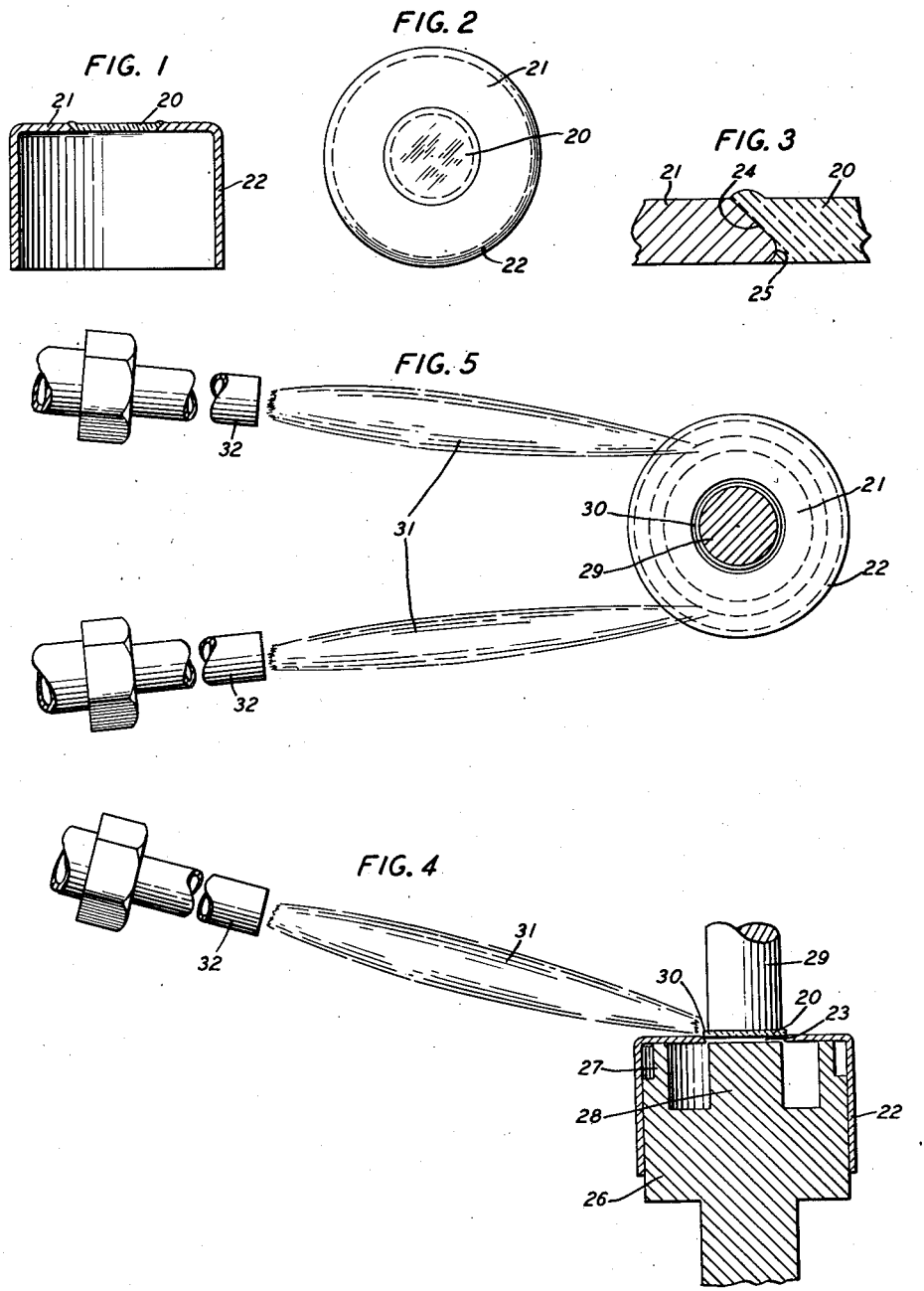
INVENTOR
E. J. WALSH
BY
ATTORNEY Dec. 19, 1950 E. J. WALSH 2,534,392
METHOD OF MAKING GLASS WINDOW SEALS
Filed July 8, 1946 2 Sheets-Sheet 2

INVENTOR
E. J. WALSH
BY
ATTORNEY

Patented Dec. 19, 1950

2,534,392

UNITED STATES PATENT OFFICE 2,534,392

METHOD OF MAKING GLASS WINDOW SEALS

Edward J. Walsh, Tenafly, N. J., assignor to Bell Telephone Laboratories, Incorporated, New York, N. Y., a corporation of New York Application July 8, 1946, Serial No. 682,043

10 Claims. (Cl. 49—81)

This invention relates to vitreous window seals and more particularly to such seals having particular utility in high frequency electromagnetic wave transmission systems for the propagation of electromagnetic wave energy in paraxial paths.

In some ultra-high frequency propagation systems employing wave guides, the generator device may be coupled to wave guide channels by hermetically sealed optical windows through which the wave energy is transmitted. The electromagnetic radiation, like light wave energy, can be propagated through the wave guide under control of the generator device but in order to attain maximum output it is essential that propagation of the energy be accomplished in paraxial beams or waves so that divergence or deflection of the beam through the window is held to a minimum. Since vitreous materials, such as optical glass, are particularly suitable for wave transmission, they have contributed materially to the advancement of wave guide propagation systems. However, in view of the fact that the window must be hermetically sealed to the generator device, considerable difficulty has been encountered heretofore in obtaining maximum efficiency, due to distortion introduced by deformation of the window surfaces because of the sealing temperatures employed in producing the vacuum-tight and hermetic joint between the glass window and the casing of the generator device.

An object of this invention is to increase the output efficiency of wave propagation systems employing window couplings.

Another object of the invention is to eliminate distortion in the paraxial waves passing through the coupler.

A further object of the invention is to facilitate the sealing of the window coupling without varying the refractive index of the optical window.

Another object of the invention is to substantially prevent birefringence effects incident to the sealing joint from affecting the paraxial transmission of the wave energy through the hermetically sealed window coupler.

A further object of the invention is to preserve the optical plane surfaces of the window during sealing whereby subsequent grinding and polishing are eliminated.

Another object of the invention is to increase production in manufacture by obviating the need for grinding and polishing operations of the optical window individually after the seal is produced.

In accordance with features of this invention, these and other objects are attained, in one broad aspect, by a method of sealing an optical transparent window in the wall area of a casing or enclosure involving the substantially complete masking of the window or optical roundal during the fushing of the window into the wall to provide a hermetically sealed joint with the enclosure so that the opposite plane surfaces of the window are preserved and subsequent grinding and polishing of the optical surfaces are eliminated.

In one specific aspect of the invention, an optically flat roundal is initially ground and polished to the desired degree to attain high efficiency in the transmission of paraxial waves through the window and the processed vitreous window is hermetically sealed in a vacuum-tight manner in a metallic element having an opening to receive the window, the peripheral edge of the opening being shaped to provide a shield for the sealed edge of the window whereby irregularities of surface contour of the window at the point of sealing to the metal element are prevented from producing interference in the transmission of energy through the window. The prepared window is placed in the opening of the metal element with the lower edge resting on a tapered wall of the element. A pressure member engages the outer flat surface of the window and substantially covers the window except for a peripheral zone substantially equivalent in width to the tapered wall of the metal element. The limited exposed portion of the window is heated to a plastic state and the pressure bearing on the window forces the plastic periphery to flow into contact with the tapered wall of the metal element and be hermetically sealed thereto. Inward movement of the window during the fusing operation is arrested by a flat stop member which limits displacement thereof so that the excess plastic periphery fills the space between the window and the metal element.

A feature of this construction is the preservation of the initial optically flat surfaces of the window over the useful portion thereof whereby the transmission of wave energy will be along paraxial paths due to the plain surfaces of the window.

Another feature of the invention relates to the shielding of irregularities in the window surfaces incident to the sealing operation. The fringe of the window is necessarily distorted by the plastic condition of the periphery during the sealing. After the window sets succeeding the fusing operation, the distortions in the glass are masked, by the beveled portion of the metal element, from the wave source and prevented from introducing distortion in the wave transmission through the window. Therefore, only paraxial wave energy transmission through the window obtains so that high efficiency is attained.

This procedure eliminates the need for subsequent grinding and polishing operations after the seal is completed and facilitates manufacturing methods. Furthermore, this procedure permits mass grinding and polishing of the optical roundals prior to the sealing operation and avoids individual grinding after sealing. The completed window seal is substantially free from strains and stresses so that annealing of the glass after the seal is finished is unnecessary.

Other features and advantages of the invention will be apparent from the following detailed description when considered in connection with the accompanying drawings wherein:

Fig. 1 is a cross-sectional view of a window seal produced in accordance with this invention;

Fig. 2 is a plan view of the window seal shown in Fig. 1;

Fig. 3 is an enlarged partial view in cross-section of the seal showing the shielding of the distorted portion of the seal by the overhang of the metal causing;

Fig. 4 illustrates, in partial cross-section, the arrangement of parts involved in the sealing operation;

Fig. 5 is a plan view showing the distribution of the burner flames on the metal element;

Figure 10:
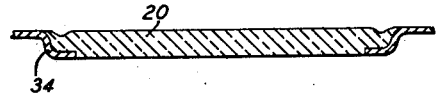
Figure 9:
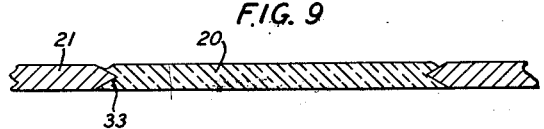

Fig. 9 shows a further modification of the seal involving a knife edge bevel in the opening of the metal element; and Fig. 10 is a cross-sectional view of another form of seal illustrative of the invention in which the metal element is pressed thin stock providing an annular recess for the thick glass window and the pressed inner rim of the metal shields the irregularities in the sealed portion of the window.

Referring to the drawings and particularly to Figs. 1 to 5, inclusive, a window seal constructed in accordance with this invention is particularly suitable for use as an output coupler of a high frequency power generating device of the magnetron type in which electromagnetic energy is generated in a resonant cavity of the device and projected as wave energy through an optical window interposed between the generating device and a wave guide. In order to attain the highest efficiency in the propagation of the wave energy between the generating device and the wave guide, it is essential that the output energy passing through the optical window coupler pass through the window in paraxial paths or beams to minimize distortion of the wave energy in the system. To obtain this objective, the optical surfaces of the transparent window through which the wave energy is propagated must be accurately ground and polished to insure positive flat surfaces on opposite sides of the window.

Since the generating device is maintained at a relatively low pressure in a high vacuum device or at some desired low pressure of a gaseous atmosphere to facilitate electronic generation of the wave energy in the device, it is necessary that the vitreous window coupler between the source and the propagating system be hermetically sealed to the casing of the device. If the vitreous window is sealed to the metal casing of the generating device without special precautions, it is evident that subsequent regrinding and repolishing of the window will be necessary to remove irregularities of contour of the vitreous window before the coupling is satisfactory for use. This entails individual grinding of the finished seals and the provision of special jigs for processing the windows after the sealing operation. Furthermore, the heating stresses set up in the vitreous window during the sealing operation require an additional annealing treatment to remove these stresses and thereby increase the production cost of such apparatus.

In accordance with this invention these difficulties are overcome in a novel manner which facilitates production and materially reduces the manufacturing cost for metal-to-glass window seals in such applications. Of course, the invention is not limited to this specific aspect since the optical transparent window sealed to metal may be employed in various electrical devices employing a sealed window having optically flat surfaces.

The window 20 is preferably a vitreous material such as borosilicate glass, having low thermal expansion characteristics and the glass is preferably sealed to a metallic member 21 having equivalent thermal characteristics, such as a nickel-cobalt-iron alloy commercially obtainable in various grades as "Kovar" alloy. For illustrative purposes the alloy metal is shown in Fig. 1 as a cup-shaped shell 22 which may form a part of the casing of the generating magnetron device. This shell is circular in form and is provided with a circular central opening 23 for the reception of the window 20. In one form of the shell, the inner surface surrounding the opening is beveled, as shown in Fig. 3, to a 45-degree angle 24 with the lower edge of the metal rounded at 25 to eliminate sharp edges. The thickness of the metal member is not material although in the present application the thickness is shown as substantially equal to the thickness of the vitreous window 20 to insure stability in the casing structure to prevent strains being set up at the sealed joint of the glass and metal element. The window blank 20 may be secured from suppliers of optical glass of the borosilicate type in the shape of flat roundals of desired diameter to suit the purpose for which the window is desired. These blanks are initially ground and polished in groups to the proper thickness so that the simultaneous grinding will produce windows having the same transmission characteristics. The processed roundals are then ready for the sealing operation.

Figure 6:
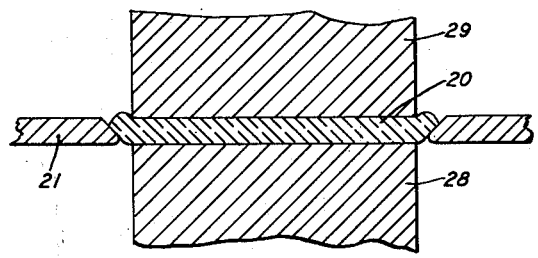
Fig. 6 is an enlarged cross sectional view showing the collapse of the vitreous disc into contact with the lower stop block.
Figure 7:
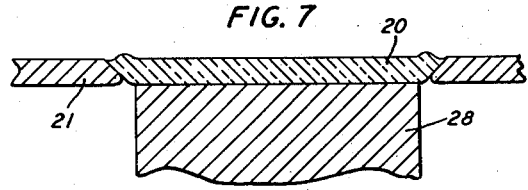
Fig. 7 shows the fusing of the window seal to the metal element to complete the joint therebetween.

As shown in Fig. 4, the shell 22 is mounted on a holding fixture or head 26, preferably of stainless steel, the shell slidably fitting over the head and the head being provided with an upwardly extending annular rim 27 which engages the inner surface of the shell portion 21. The head also is provided with a central stop or setting portion 28 which is aligned with the circular opening 23 in the shell. The glass blank has a diameter slightly larger than the smaller diameter of the opening in the shell so that its lower edge is in contact with an intermediate surface of the beveled portion 24 of the shell closure portion 21, as shown in Fig. 4. Prior to the fusing operation of the window in the shell, a pressure head 29 is placed in contact with the roundal 20 and coaxial therewith so that only a limited edge 30 is exposed in the sealing process. The pressure head 29, therefore, substantially shields the greater area of the optical roundal and is preferably formed of stainless steel, to serve as a large heat dissipating mass whereby the area of the optical roundal covered thereby is shielded from the sealing flame applied for fusing the window into the metal shell. The fusing or sealing operation is preferably carried out in accordance with this invention by projecting sharp intense burner flames 31 from nozzle 32 which supply a mixture of purified illuminating gas and oxygen for producing the flames which are directed on the top portion 21 of the shell mounted on the rotatable head 26. The shell is initially heated in a low pressure flame to oxidize the "Kovar" metal and prepare the sealing surface 24 for wetting engagement with the glass. The intense burner flames for producing the sealing of the glass heat the shell 22 to a high temperature of about 900° C. and the heat is conducted to the exposed annular rim 30 of the glass roundal in contact with the tapered opening of the shell. The conduction of heat softens the exposed glass to a plastic state and when this occurs the pressure head 29 continually in contact with the glass roundal 20 forces the window into the circular opening 23 until it rests on the stop portion 28 of the lower head. In this operation the plastic rim portion is bent as shown in Fig 6. The pressure head 29 is removed as shown in Fig. 7. The plastic glass rim, which is necessarily deformed in the pressing operation, is continually flowing due to the conduction of heat through the shell as a result of the burner flames played thereon and the excess glass gradually flows into contact with the tapered and rounded surfaces 24, 25 of the opening to form a hermetically sealed joint at the juncture of the window and metal portion. Of course, the heating of the metal shell to the desired temperature may be performed by other means, such as a high frequency induction coil.

Figure 8A:
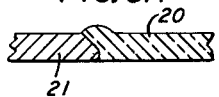
Fig. 8A illustrates in partial section a modified sealed joint in which a slightly larger disc produces a different peripheral terminal seal at the conjoint surfaces of the disc and metal element.
Figure 8B:
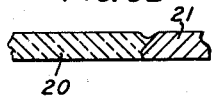
Fig. 8B shows a section of the window seal in which the window is substantially uniform with the thickness of the metal wall member but the terminating seal forms an annular ridge at the upper surface of the metal member.

During the sealing operations, the major portion of the optically flat window is held to the prescribed dimensions attained in the grinding and polishing operation due to the masking of the greater portion of the window by the pressure and stopping heads 29 and 28, respectively. However, the peripheral zone which is deformed in the pressing operation, produces irregular contours at the termination of the seal with the metal member due to the fusing operation, but this portion is substantially prevented from interfering with the paraxial transmission of wave energy through the optical window by being shielded from the source of the energy due to the configuration of the walls at the point of sealing. The smaller diameter of the opening which faces the inner surface of the shell provides a masking rim of increasing diameter which shields the irregularities in the seal and thereby prevents the peripheral portion of the window from interfering with the wave energy projected through the optical flat portion of the window. The termination of the seal may be variously changed by the diameter of the glass roundal 20 with respect to the diameter of the opening 23 in the shell 22. If the glass roundal has a diameter substantially the same as the larger diameter of the opening, the terminating seal produced by the fusing operation will be as shown in Fig. 8A, in which the excess glass piles up in a rim at the larger diameter of the opening and is therefore shielded by the tapered walls of the opening. If the glass roundal is of a diameter only slightly more than the smaller diameter of the opening, the terminating seal will be as shown in Fig. 8B in which an annular recess is formed at the termination of the larger diameter of the opening.

The finished window after sealing has a surface area approximately 95 per cent of which is optically flat and, therefore, increases the efficiency of transmission and propagation of the wave energy through the window. Furthermore, the method of sealing eliminates annealing of the seal to remove strains and stresses in the glass since the gentle flowing of the plastic rim into sealing engagement with the "Kovar" tapered edge of the shell avoids strain in the glass.

After the seal is completed, the complete shell assembly is removed to an oven which is maintained at a temperature of 525° C. and the assembly is cooled at a rate suitable for the metal-to-glass seal. While the tapered seal is preferable in certain applications, the 45-degree angle is not critical since this angle merely permits leeway or tolerance in manufacturing variations in part sizes. The only requirement is that the lower surface of the shell adjacent the opening should be of smaller diameter than the opposite surface to provide the shielding rim for the distorted portion of the sealing surface through the window. In the same manner, as shown in Fig. 9, the shell or metal casing 21 may be shaped to provide a knife edge opening whereby the smallest diameter 33 is intermediate the top and bottom surfaces of the shell and the knife-edge portion forms a shielding rim for the irregularities in the termination of the seal of the window. This seal has a particular advantage when pressure is directed on both sides of the optical window. Similarly, as shown in Fig. 10, the metal element or casing need not have the same thickness as the optical roundal fitted in the opening. In this form of window, the metallic portion may be formed of thin "Kovar" metal which is pressed to form an annular recess 34 around the opening in the casing and the window 20 is hermetically sealed in the depression, in accordance with the methods heretofore described, so that the irregularities in the form of annular rings at the termination of the seal are completely shielded by the overhang of the metal shell which covers or masks the distorted portion of the optical window from the wave energy projected through the window.

While the invention has been described with respect to an optical roundal in a similarly-shaped opening of a metal casing, it is, of course, understood that various modifications can be made in size and shape of the optical window to satisfy any other application of the sealing method to electrical devices in which such a window is desired. Therefore, the invention is only to be limited by the scope of the appended claims.

What is claimed is:

1. The method of sealing an optical window to a metal member, comprising forming an opening in said member with a beveled surface extending angularly from the upper to the lower surface of said metal member, inserting a vitreous window in said opening to contact said beveled surface, applying pressure to said window and substantially masking the surface area of said window, heating said metal member to such a temperature that conduction heating plasticizes the exposed edge of said window to fuse the soft edge to said beveled surface without plasticizing the masked area of said window, removing the pressure on said window, and completing the fusing operation to hermetically seal the window in said metal member.

2. The method of sealing an optical window to a metallic member, comprising forming an opening in said member with a beveled surface, inserting a vitreous window in said opening to contact said beveled surface, applying pressure to said window and substantially masking the surface area of said window, heating said metal member to such a temperature that conduction heating plasticizes the exposed edge of said window to fuse the soft edge to said beveled surface, positioning a stop member below said window to limit the drop thereof in said opening, and completing the fusing operation to hermetically seal the window in said metal member.

3. A method of hermetically sealing a preground optical window in a metallic casing, comprising mounting a metallic cup having a beveled opening on an internal head, placing the window in said opening but out of contact with said head, pressing an external head on said window so that only the periphery of said window is exposed, heating the rim of said window until plastic, pressing said window into contact with said internal head, and sealing said window to the surface of said beveled opening.

4. The method of hermetically sealing a preground optical flat roundal in a beveled circular opening of a metallic member, comprising fitting said roundal within said opening so that the edges thereof are in contact, placing a pressure head on said roundal with only the contacting boundary of said roundal exposed, projecting heating flames toward said member to raise the temperature thereof to red heat, heating said exposed boundary by conduction to render the boundary of said roundal only plastic, pressing the roundal into said opening, and sealing the exposed plastic portion of said roundal to said beveled opening.

5. The method of hermetically sealing a preground optical flat roundal in a beveled circular opening of a metallic member, comprising fitting said roundal within said opening so that the edges thereof are in contact, placing a pressure head on said roundal with only the contacting boundary exposed, projecting heating flames toward said member to raise the temperature thereof to red heat thereby heating said exposed boundary by conduction to render the boundary portion plastic without rendering plastic the remainder of said roundal, pressing the roundal into said opening until surfaces of said roundal and member are in the same plane, stopping the pressure when the lower surface of said roundal is level with the lower surface of said member, and fusing the sealed joint of said roundal in said opening.

6. The method of hermetically sealing an optically flat glass window in a beveled opening of a metallic casing, comprising initially grinding and polishing said window to form optically plane surfaces on opposite sides, placing said window in edge relation to a beveled opening in said casing, masking said window on the top surface in such a manner that only a peripheral edge portion is exposed within the confines of the beveled surface, heating only said exposed edge portion to a plastic state, pressing said window into said beveled opening, removing the pressure on said window, and fusing the plastic edge portion to said beveled surface to form a vacuum-tight joint.

7. The method of sealing an optical window to a metallic member, comprising forming an opening in said member, shaping the inner periphery of said member so that one surface is of smaller diameter than the opposite surface to form a tapered cavity adjacent said opening, placing an optically flat window over said opening with the lower edge of said window in contact with the boundary of said tapered cavity, applying a heat shielding mask to the upper surface of said window over an area equivalent to the smaller diameter of said opening, heating said metal member to such a temperature that conduction of heat renders the exposed edge of said window plastic, the heat shielding mask preventing the remainder of said window from fusing, pressing said window into said cavity until the lower surface thereof is level with the smaller diameter of said opening, and continuing heating of said plastic edge to fuse said edge to the surface of said tapered cavity.

8. The method of sealing a vitreous window having optically flat surfaces to a metallic casing having an opening to receive said window, said member having the boundary of the opening shaped to provide different diameters at the top and bottom surfaces thereof, said method comprising inserting said window into said opening having a larger diameter with the lower edge of the window in contact with an intermediate surface between said diameters, substantially shielding the upper surface of said window with a heat dissipating member of large mass, heating said metal casing to a high temperature, exposing only a peripheral zone of said window to said heating to plasticize said zone, bending said plasticized zone to depress said window into said opening, and fusing said zone to form a hermetically sealed joint with said casing.

9. The method of hermetically sealing a glass window to a metallic member having the window opening therein, which comprises initially grinding and polishing said window to provide optical surfaces, inserting said window within said opening with the lower edge in contact with an intermediate annular boundary of said opening, shielding the upper surface of said window except for a peripheral edge adjacent said contact point, heating said member to render only said peripheral edge plastic, pressing said window into said opening, stopping the descent of said window so that the lower surface thereof is level with the lower surface of said member, removing said shielding, flowing the plastic edge in hermetic sealing contact with the boundary surface of said opening, and confining the sealing irregularities of surface contour of said window to a peripheral zone within an annular area shielded by a portion of said metallic member.

10. The method of hermetically sealing an optically flat glass window in a metallic casing having an opening of varying diameter, which comprises placing said window of slightly larger diameter than the smallest diameter within said opening, projecting heating flame towards the surface of said casing adjacent said window, applying a shielding mask member in direct engagement with the major portion of said window to expose the contacting edge of said window to the heating effect of said casing, heating only said exposed edge to a plastic state by heat conduction, bending said plastic edge into said opening, flowing the plastic glass into sealing engagement with the walls of said opening, the terminating ripples of surface deformation due to fusing of the glass being confined to said sealing edge, and shielding said surface deformation area by the portion of the casing adjacent said opening which overhangs the sealing irregularities.

EDWARD J. WALSH.

REFERENCES CITED

The following references are of record in the file of this patent:

UNITED STATES PATENTS

| Number | Name | Date |
|---|---|---|
| 2,296,307 | Power | Sept. 22, 1942 |
| 2,419,049 | Alpert | Apr. 15, 1947 |